United States Patent
Kim et al.

(10) Patent No.: US 7,548,376 B2
(45) Date of Patent: Jun. 16, 2009

(54) TOTAL INTERNAL REFLECTION MICRO LENS ARRAY

(75) Inventors: Jin Jong Kim, Kyungki-do (KR); Alexander Evgenievich Linkov, St.-Petersburg (RU); Hee Dong Kim, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 11/522,423

(22) Filed: Sep. 18, 2006

(65) Prior Publication Data

US 2007/0091444 A1    Apr. 26, 2007

(30) Foreign Application Priority Data

Sep. 16, 2005   (RU)   ............................... 2005128772

(51) Int. Cl.
  *G02B 27/10*   (2006.01)
  *F21V 5/00*    (2006.01)
  *F21V 5/02*    (2006.01)

(52) U.S. Cl. .................. 359/628; 362/337; 362/339

(58) Field of Classification Search ................ 359/457, 359/595, 627, 628, 741, 742, 743; 362/327, 362/337, 339
See application file for complete search history.

(56) References Cited

U.S. PATENT DOCUMENTS

| | | | | |
|---|---|---|---|---|
| 3,578,841 | A * | 5/1971 | Elmer | ........................ 359/457 |
| 5,577,492 | A * | 11/1996 | Parkyn et al. | ................ 126/698 |
| 6,456,437 | B1 | 9/2002 | Lea et al. | |
| 7,140,735 | B2 * | 11/2006 | Peterson et al. | ................ 353/69 |
| 7,230,758 | B2 * | 6/2007 | Huang | ........................ 359/457 |
| 7,350,925 | B2 * | 4/2008 | Engstrom | .................... 353/38 |
| 2002/0034710 | A1 | 3/2002 | Morris et al. | |
| 2008/0204901 | A1 * | 8/2008 | Amano et al. | ................ 359/742 |

* cited by examiner

*Primary Examiner*—David N Spector
(74) *Attorney, Agent, or Firm*—McDermott Will & Emery LLP

(57) ABSTRACT

The invention relates to a total internal reflection micro lens array for a wide-angle lighting system. The micro lens array includes a plurality of Fresnel lens structures formed on a same optical incidence surface. Each of the Fresnel lens structure includes a plurality of grooves, each having a reflecting surface and a refractive surface. Incoming radiation incident through the incidence surface of the lens structure is internally totally reflected by the reflecting surface, refracted by the refractive surface and exits the lens structure.

7 Claims, 9 Drawing Sheets

(a)

(b)

(a)

(b)

(a)

(b)

TOTAL INTERNAL REFLECTION MICRO LENS ARRAY

BACKGROUND OF THE INVENTION

1. Field of the Invention

The invention deals with optical devices and can be used in designing the equipment for light beam shaping and spatial restructuring, and more particularly, to a micro lens array designed to make use of the total internal reflection and intended for wide-angle lighting systems.

2. Description of the Related Art

The micro lens array for transformation of light beams is generally used as a structured screen to control propagation (pass) or diffusion of an incident light beam. The micro lens array is a set of micro lenses with sizes from 10 up to 200 micrometers which are packed by one of known methods, for example, by means of the rectangular or hexagonal packing, on one surface.

Existing micro lens arrays enable increasing an angle of divergence of an incident beam up to 110-120 degrees, with efficiency of such devices ranging from 50% to 80%. However there are cases (for example, back light for TFT displays) where such angles of divergence are insufficient and the angle of divergence of radiation must be at least 130 degrees. Such angle of divergence can be gained either by application of materials with higher refractive index or by application of basically new optical solutions.

Various kinds of materials are used for the micro lens array production, and the most common is a transparent polymethyl methacrylate. The refractive index of this material is 1.49. This value imposes certain restrictions on the maximum angle of divergence and does not allow gaining angles over 110 to 120 degrees. At such angles the array efficiency does not exceed 80%. This phenomenon is a result of refraction of the part of Fresnel loss or structural limitations of the inner surface (the inside) of the array at greater angles.

Let's consider some known solutions based on the micro structured optics.

US patent publication No. 2002/0034710 discloses the methods are described for forming the structured screens for transformation of an input beam to a beam with controlled parameters. The structured screen is a set of the micro lenses located on a surface, and parameters of each micro lens are governed by a certain law. Such screen transforms an input beam into a divergent beam with determined parameters. The drawback of the said patent consists in limited angle of divergence of the output beam, which is a result of the insufficient refractive index of the used material.

U.S. Pat. No. 6,456,437 discloses the most similar to the claimed solutions. The authors offer to use a disordered array of prisms located on one surface, to solve a problem of magnification of the divergence angle and of homogenization of an incoming light beam. The angles of prisms are chosen in such a way that the incoming beam undergoes total internal reflection. The drawback of the said method consists in difficulty of obtaining uniform light distribution or a specific angle of divergence due to the limited conditions of the incoming radiation or angles of prisms.

SUMMARY OF THE INVENTION

The claimed invention is aimed at developing a device which would allow to widen the angle of divergence of a beam outgoing from a micro structured optics of at least 100 degrees (depending on the used light source), with the efficiency of 80-90% and with totally controllable shape of the outgoing beam.

The technical result is achieved due to application of an optical microstructure array of a new design, where the input light source is either a collimated or divergent light beam. The optical microstructure array is designed to make use of the total internal reflection and is intended for the wide-angle lighting systems. The optical microstructure array comprises an optical incidence surface and a plurality of optical microstructure formed on a surface opposite to the optical incidence surface. Each of the optical microstructures includes prismatic units having reflecting and refractive parts, and the optical microstructure array has a functional dependence between the input beams, the outgoing beams and the optical microstructure parameters according to the formula presented further. The claimed optical microstructure array defines the outgoing beam in such a manner that the central part of the optical microstructure (the central prismatic unit) has such a shape as to direct light to the wide-angle band, and the other prismatic units located between the centre and the edge, define the outgoing beam from the edge to the centre, where the array can be packed by any known method, for example, hexagonally or right-angled (rectangular).

Desired parameters are achieved due to use of two surfaces for formation of an outgoing beam, namely, reflecting surface and refractive surface, and also due to a special arrangement of outside plains of the optical microstructures.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

The essence of the claimed invention is further explained on the basis of the following drawings.

Figure 1:
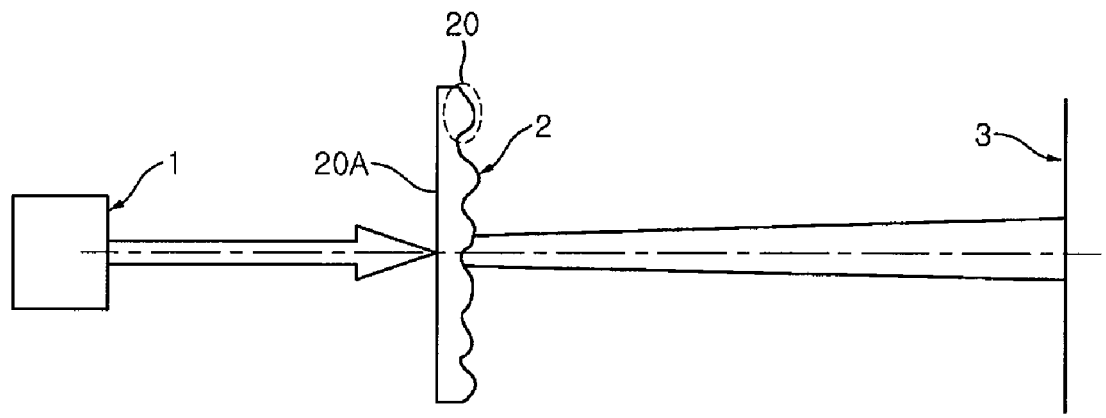
FIG. 1 shows an optical arrangement including a total internal reflection (TIR) optical microstructure array according to the present invention.

FIG. 1 shows an optical arrangement including a total internal reflection (TIR) optical microstructure array 2 according to the present invention, where 1 is a light source and 3 is a plane of analysis.

Figure 7:
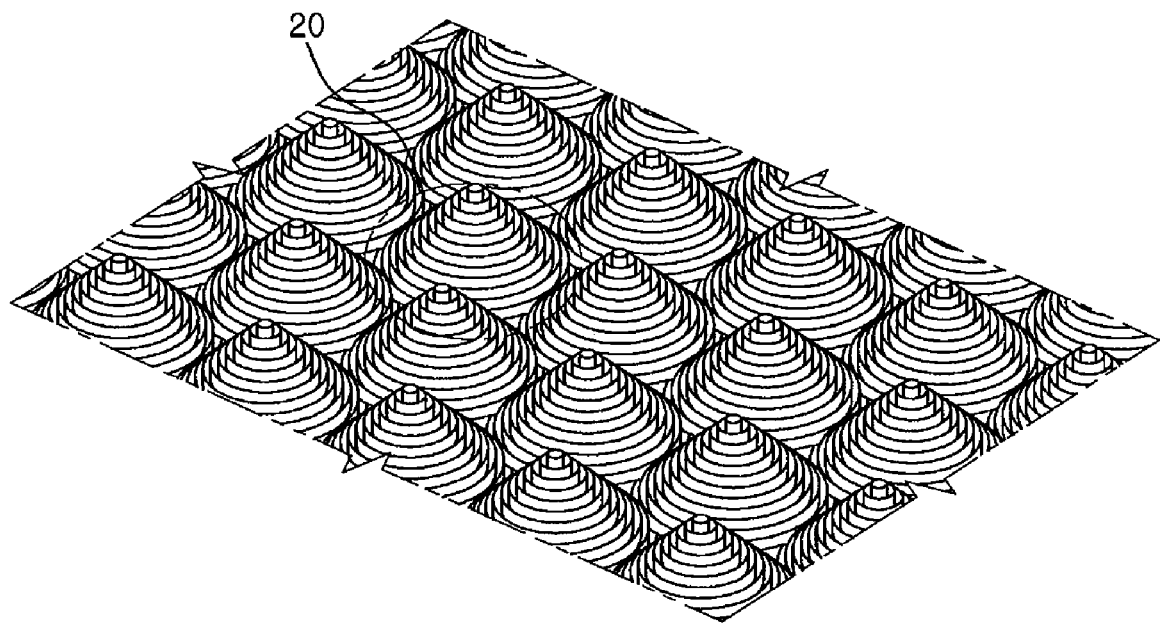
FIG. 7 is a perspective view of a TIR optical microstructure array according to an embodiment of the present invention.

FIG. 7 is a perspective view of the TIR optical microstructure array 2.

Figure 2:
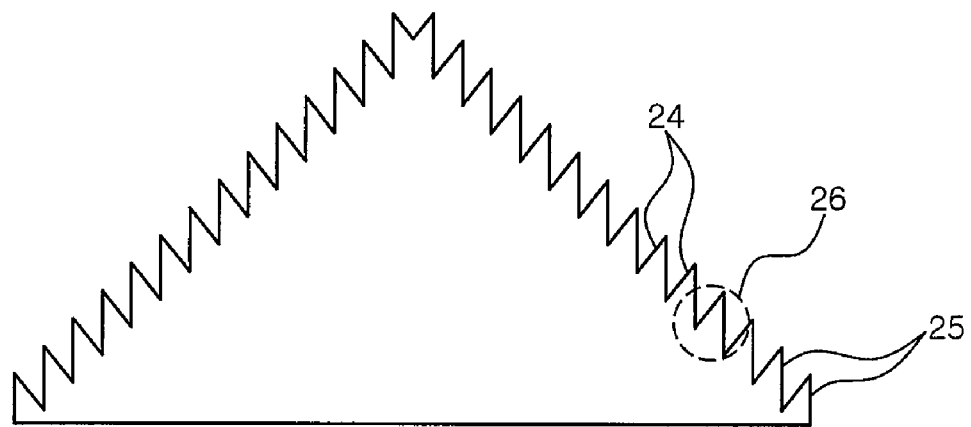
FIG. 2 is a sectional view of the optical microstructure of FIG. 8 taken along line I-I'.
Figure 8:
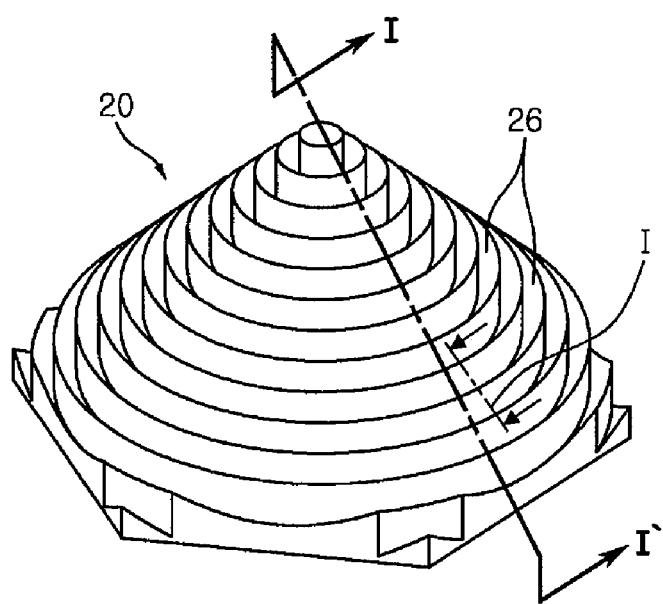
FIG. 8 is a perspective view of one optical microstructure of the TIR optical microstructure array of FIG. 7.

As shown in FIGS. 2 and 7, the TIR optical microstructure array 2 includes a plurality of optical microstructures 20, which are packed by any known non-periodic or periodic method (for example, the rectangular or hexagonal arrangement). The optical microstructures 20 are arranged on the same optical incidence surface 20A. One optical microstructure 20 of the TIR optical microstructure array 2 is shown in FIG. 8. In this specification, the optical microstructure can be also called a "micro lens".

FIG. 2 is a sectional view of the optical microstructure of FIG. 8 taken along line I-I'.

Referring to FIGS. 2 and 8, each of the optical microstructure includes a plurality of concentric and annular outwardly-extending prismatic units.

Each of the plurality of prismatic units 26 has two parts: a reflecting part (reflecting surface) 24 and a refractive part (refractive surface) 25 (see FIG. 2). Each prismatic unit 26 of the optical microstructure 20 has such configuration, that incoming radiation is totally internally reflected from the reflecting part 24 of the prismatic unit 26, refracted on the refractive part 25 and exits.

The slopes of both parts 24 and 25 of the prismatic unit 26 are pre-calculated in such a manner that they provide the necessary angular or linear energy distribution in a form of light radiation. The calculations are based on the methods of approximation, common for geometrical optics. These approximations impose certain restrictions on the sizes of lens elements.

The size of the prismatic unit 26 should exceed the radiation wavelength at which optical devices (elements) operate. Preferably, the optical microstructure includes two to ten-fold or more prismatic units in order to avoid diffraction effect. Such arrangement helps to avoid stray diffraction effects. On the other hand, a coherent radiation may cause undesirable interference effects. In such cases, it is necessary to perform additional calculations on the basis of wave optics approximations or to carry out experimental checking of the optical design.

The optical microstructure is designed (calculated) in such a manner that the central part of an optical microstructure, namely, the central prismatic unit has such a shape to direct the outgoing beam to the area of wide angles, and the other prismatic units located from the centre to the edge define the area of the outgoing beam from the edge to the centre. It allows packing optical microstructures into the optical microstructure array with the small energy losses resulting from the optical microstructures vignetting each other.

Figure 5:
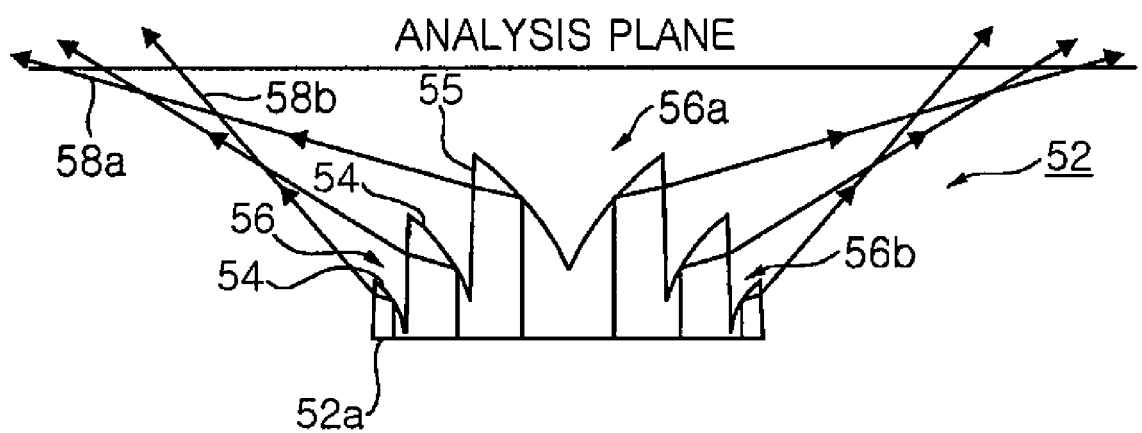
FIG. 5 is a cross-sectional view of an example of an optical microstructure which can be employed in a TIR optical microstructure array according to the present invention.

Referring to FIG. 5, an optical microstructure 52 is formed on a same optical incidence surface 52a and has a reflecting surface 54 and a refractive surface 55.

Light incident from the incident surface 52a is totally internally reflected by the reflecting surface 54 of the prismatic unit 56, and the reflected light is refracted by the refractive surface 55 and exits The optical microstructure 52 is designed in such a manner that a prismatic unit 56a in the central part of an optical microstructure, namely, the central prismatic unit has such a shape to direct the outgoing beam to the area of wide angles of the outgoing beam 58a. Also, a prismatic unit 56b in the edge of an optical microstructure has such a shape to direct the outgoing beam to the area of the outgoing beam 58b in the center. Preferably, as the prismatic units 56 of the optical microstructure 52 are located from the center to the edge, they shape the area of the outgoing beams from the wide angle to the center.

In the preferred embodiment, an incidence surface 52a of the optical microstructure 52 is planar. Alternatively, however, the incidence surface 52a can be formed as a curved surface having a predetermined degree of curvature. At this time, the incident angle is calculated on the basis of a normal line perpendicular to the curved surface.

At calculation of a slope and of a shape of the reflective surface the mathematical methods and the preset boundary values should be used, in particular, The hade (angle of incoming) of light on the reflective surface 24 should exceed the angle of total reflection, where the maximum angle is defined as follows:

$$\delta = \gamma - \arcsin\left(\frac{n_1}{n_2} \cdot \sin(\alpha)\right) > \arcsin\left(\frac{n_1}{n_2}\right) \quad (1)$$

Figure 3:
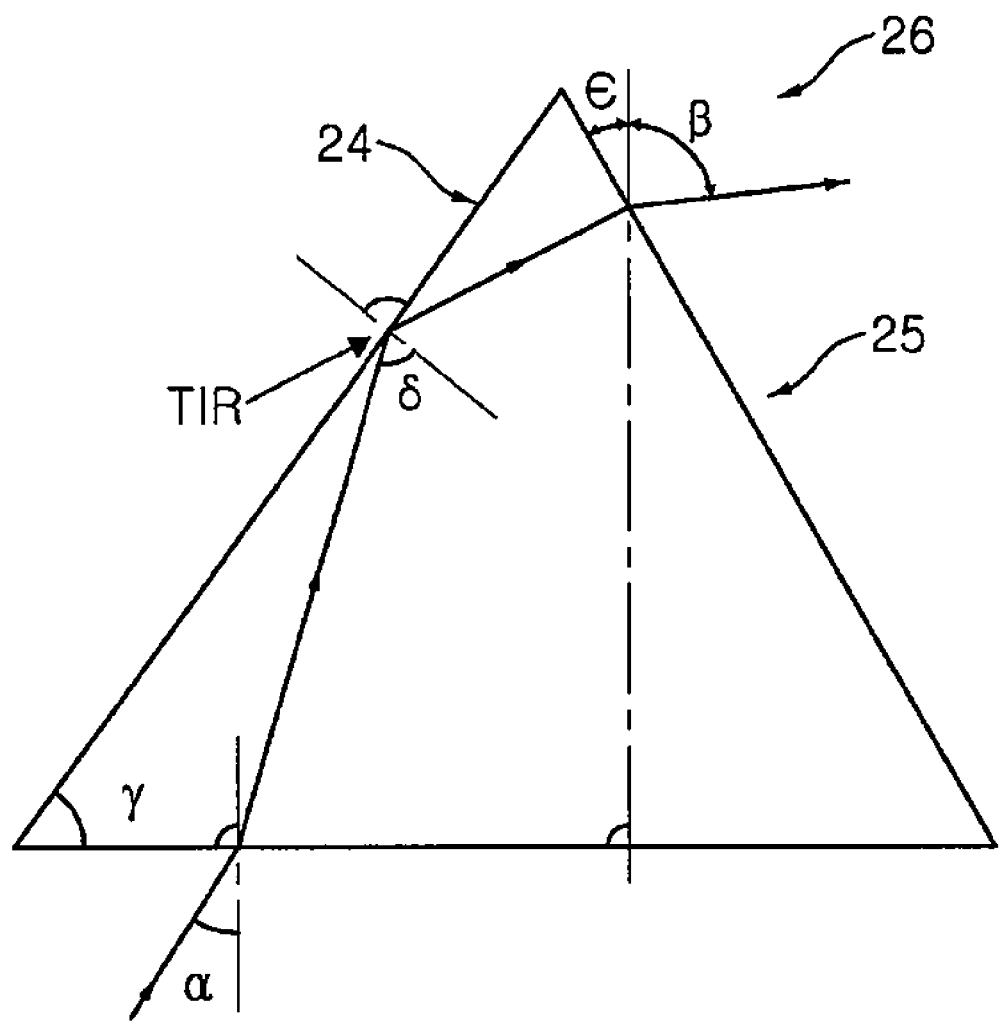
FIG. 3 is a cross-sectional view of a a prismatic unit in FIG. 2 for explaining the functional dependence between the incoming beam and the outgoing beam and the parameters of the optical microstructure.

The functional dependence between the incoming beam and the outgoing beam and the parameters of the optical microstructure is shown on FIG. 3 and is described by the following expression.

$$\gamma = 0.5 \cdot \left[\left(\left(\frac{\pi}{2} + \arcsin\left(\frac{n_1 \cdot \sin\left(\frac{\pi}{2} - \beta - \varepsilon\right)}{n_2}\right)\right) + \varepsilon\right) + \arcsin\left(\frac{n_1 \cdot \sin(\alpha)}{n_2}\right)\right] \quad (2)$$

where $\alpha$ is an input angle,
$\beta$ is an outgoing angle,
$\gamma$ is a slope of the reflecting surface,
$\epsilon$ is a slope of the refractive surface,
$n_1$ is the refractive index of air, and
$n_2$ is the refractive index of the material of an optical microstructure.

This is a way to determine the angle of the surface slope from the incoming beam and the outgoing beam.

The slope angle of the refractive surface 25 should be small—for example, 2 degrees.

For making the optical microstructure producing highly homogeneous illumination intensity, one should use the formulas (3)-(5), below, which enable calculation of the surface (see FIG. 4) by converting the incoming beams directed at angle $\alpha$, into beams with the required angular divergence (up to 170-180 degrees) and the efficiency up to 92%.

$$\gamma_n(n_1, n_2, \alpha_n, \beta_n) = \quad [3]$$
$$0.5 \cdot \left[\frac{\pi}{2} + \arcsin\left(\left(\frac{n_1}{n_2}\right) \cdot \sin\left(\frac{\pi}{2} - \beta_n - \varepsilon\right)\right) + \varepsilon + \arcsin\left(\frac{n_1}{n_2} \cdot \sin(\alpha_n)\right)\right]$$

-continued $$r_{n+1}(r_n, E, \beta_n, \beta_{n+1}, l) = \frac{1}{E-1}\left(E \cdot l \cdot tg(\beta_{n+1}) + \sqrt{\begin{array}{c} 2 \cdot E^2 \cdot r_n \cdot l \cdot tg(\beta_n) + E^2 \cdot l^2 \cdot \\ tg^2(\beta_n) + E^2 \cdot r_n^2 - 2 \cdot E \cdot r_n - \\ -2 \cdot E \cdot r_n \cdot l \cdot tg(\beta_n) - E \cdot l^2 \cdot \\ tg^2(\beta_n) + E \cdot l^2 \cdot tg^2(\beta_{n+1}) + r_n^2 \end{array}}\right) \quad [4]$$

$$E = \frac{r_0^2}{(r_0 + l \cdot tg(\beta_0))^2} \quad [5]$$

where γ and r are variables, and value of E is constant and is computed only once—in the beginning of calculation.

The parameter "n" determines the degree of purity of the optical microstructure, in other words, the precision with which the reflecting surface is calculated.

Figure 4:
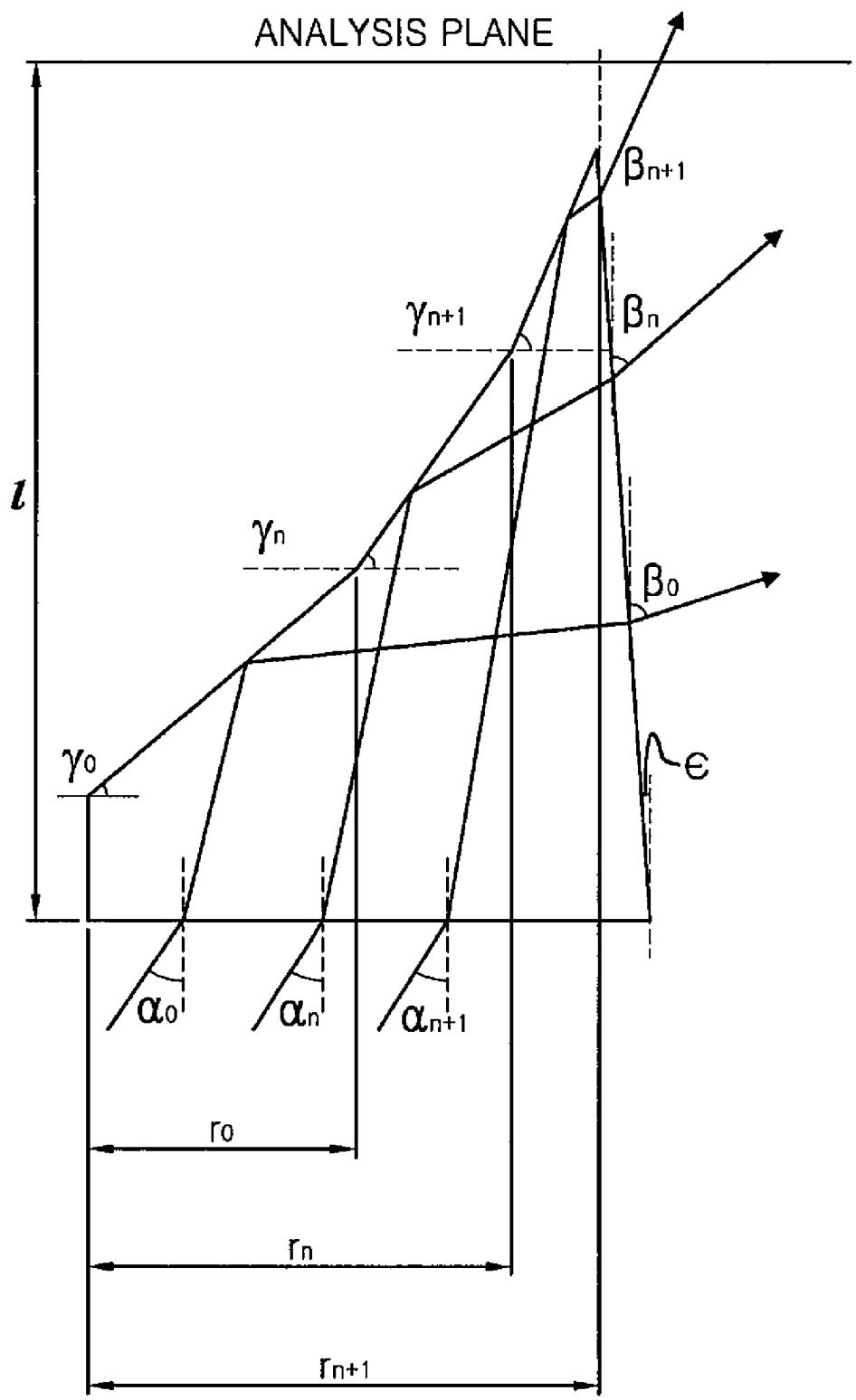
FIG. 4 is a cross-sectional view of a prismatic unit of another optical microstructure for explaining the functional dependence between the incoming beam and the outgoing beam and the parameters of the optical microstructure.
Figure 6:
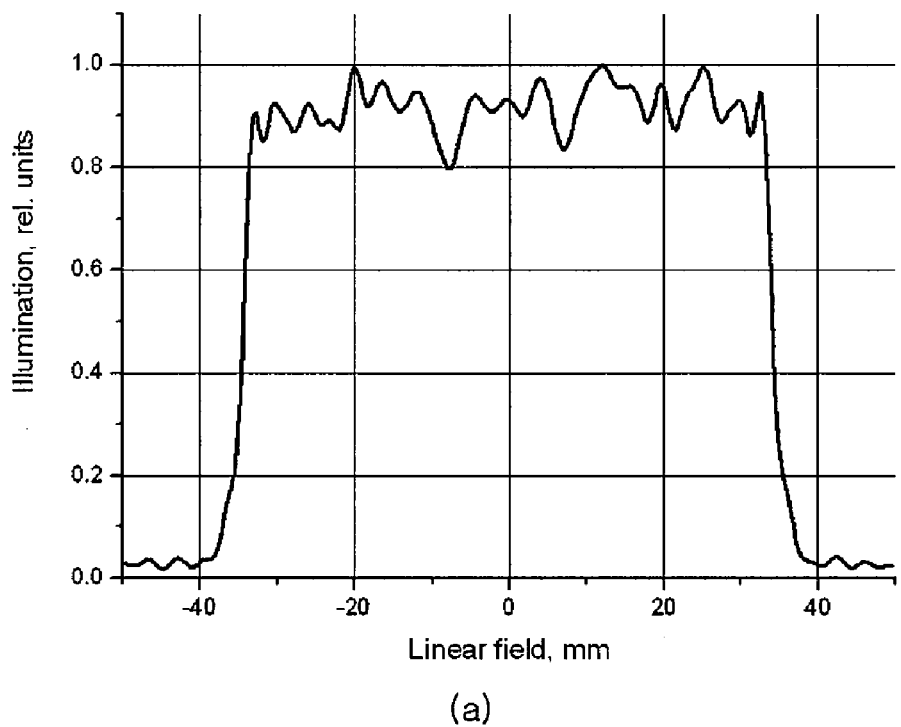
FIGS. 6a and 6b are graphs showing the distribution of illumination intensity at the distance of 13 mm from the array and the distribution at the long-range area, respectively.
Figure 6:
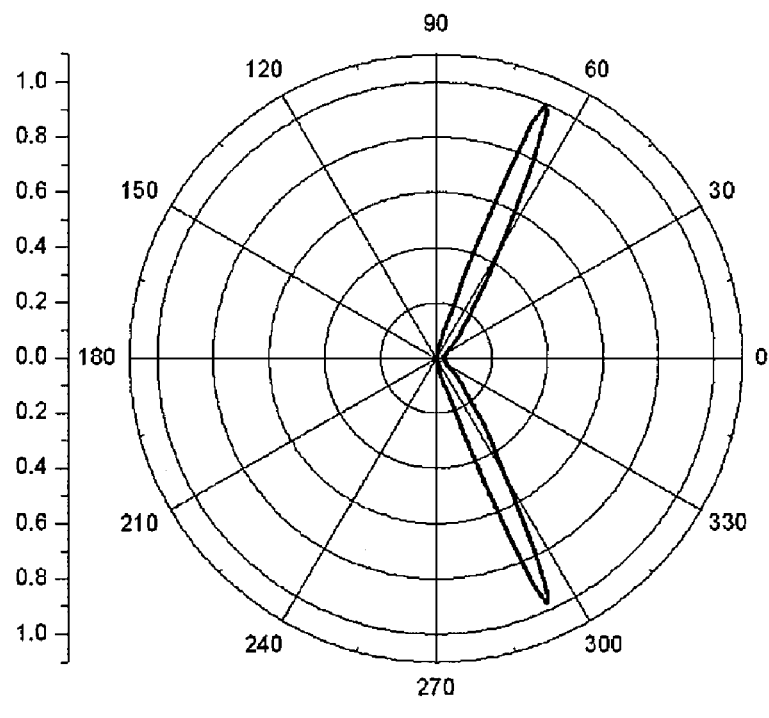

After calculation in accordance with the above formulas, one will have the surface shown on FIG. 4. This surface can be employed in the optical microstructure (see FIG. 8) and then packed into the optical microstructure array (see FIG. 7). FIGS. 6a and 6b show the distribution of illumination intensity at the distance of 13 mm from the array, and the distribution at the long-range area (far zone). The angle of divergence in this case makes 140 degrees, the efficiency is about 92%, and the light source is a collimated beam.

Figure 9:
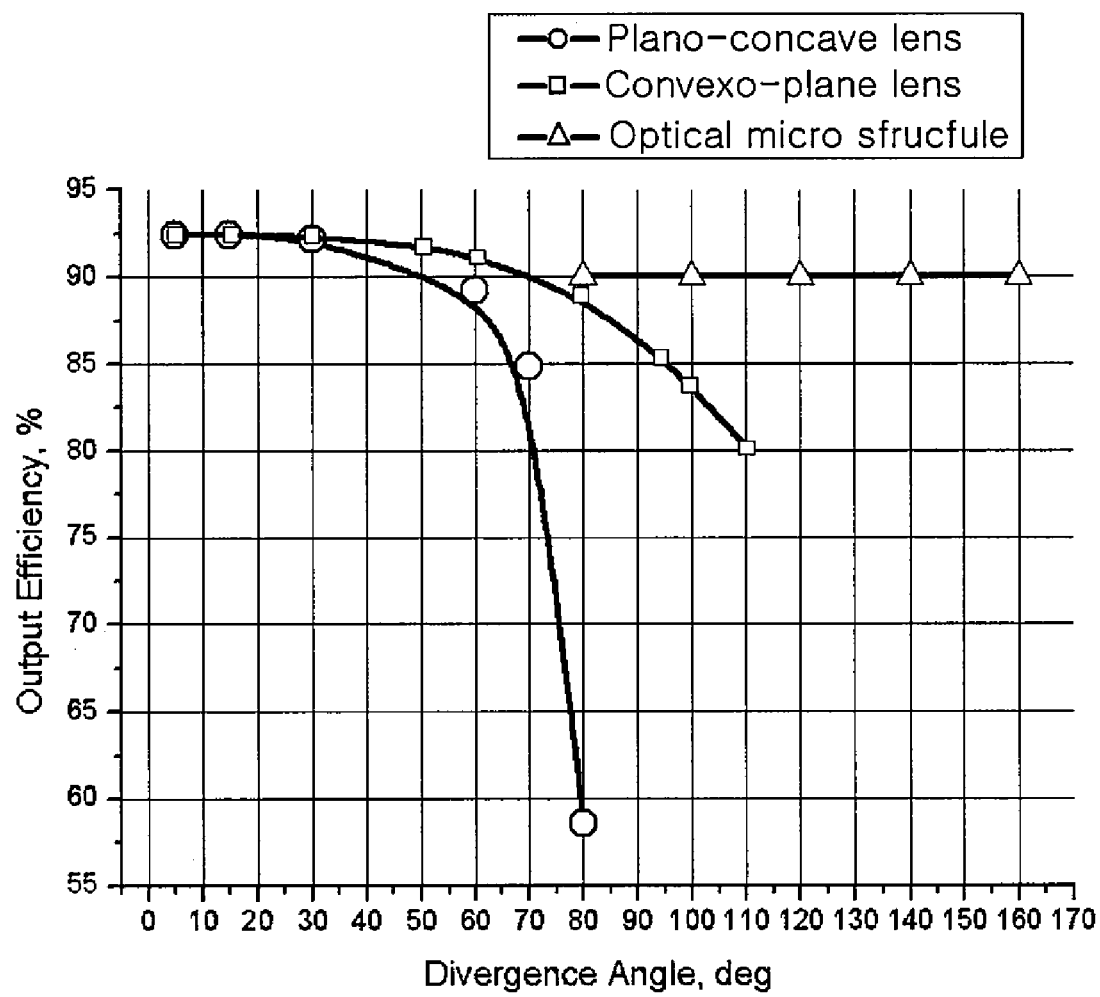
FIG. 9 is a graph showing the total output efficiency of the flat-convex lens, the convex-flat lens and the optical microstructure.

FIG. 9 illustrates the total output efficiency of the flat-convex, convex-flat and the optical microstructure arrays.

Figure 10:
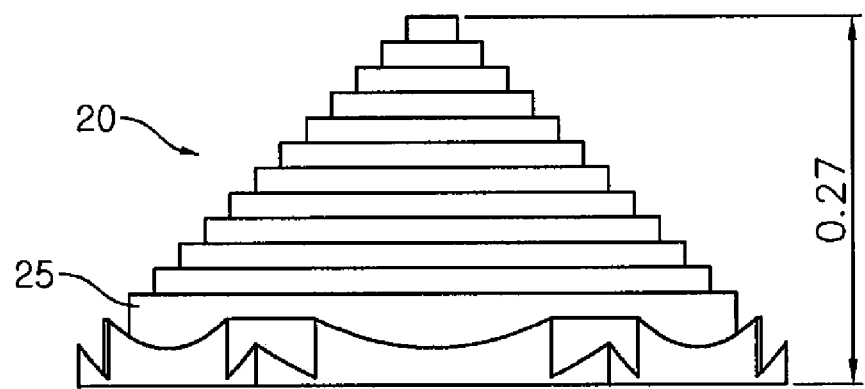
FIGS. 10a and 10b are a cross-sectional view and a top view of another example of an optical microstructure, which can be employed in a TIR optical microstructure array according to the present invention, respectively.
Figure 10:
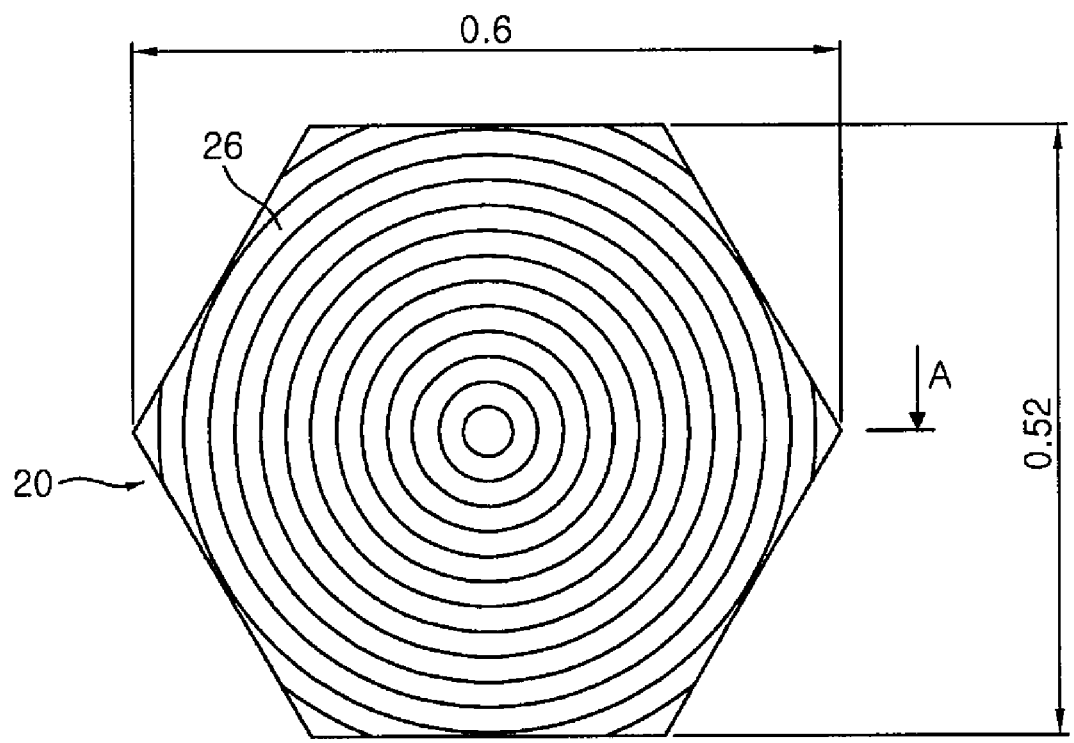
Figure 11:
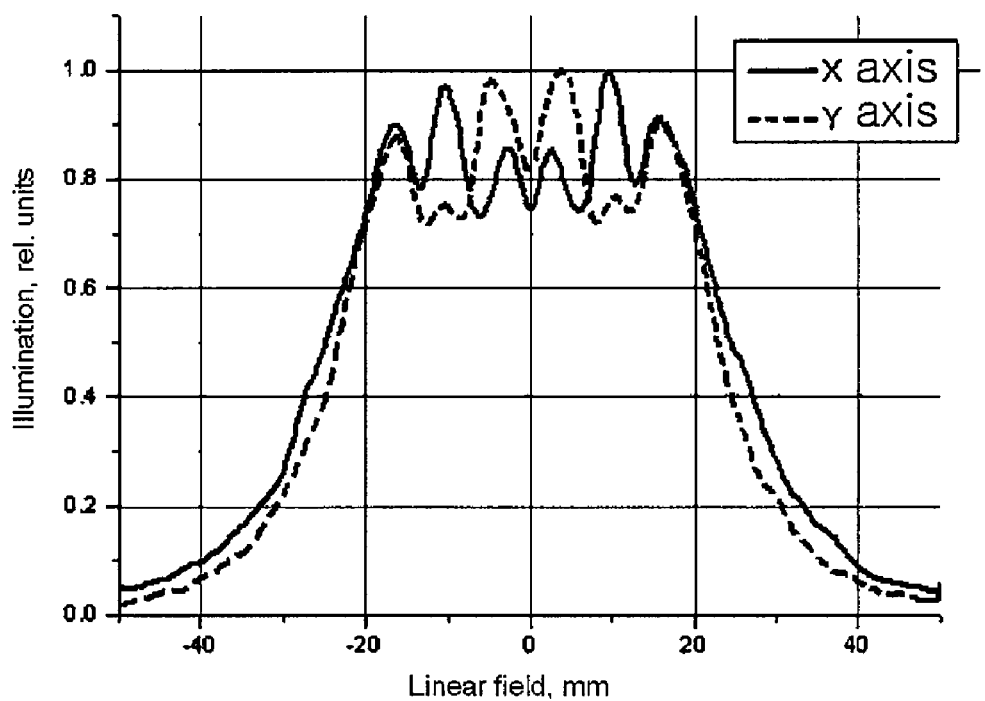
FIGS. 11a and 11b are graphs showing the resulting angular and linear distributions of a TIR optical microstructure array comprising the optical microstructure of FIG. 10a, respectively.
Figure 11:
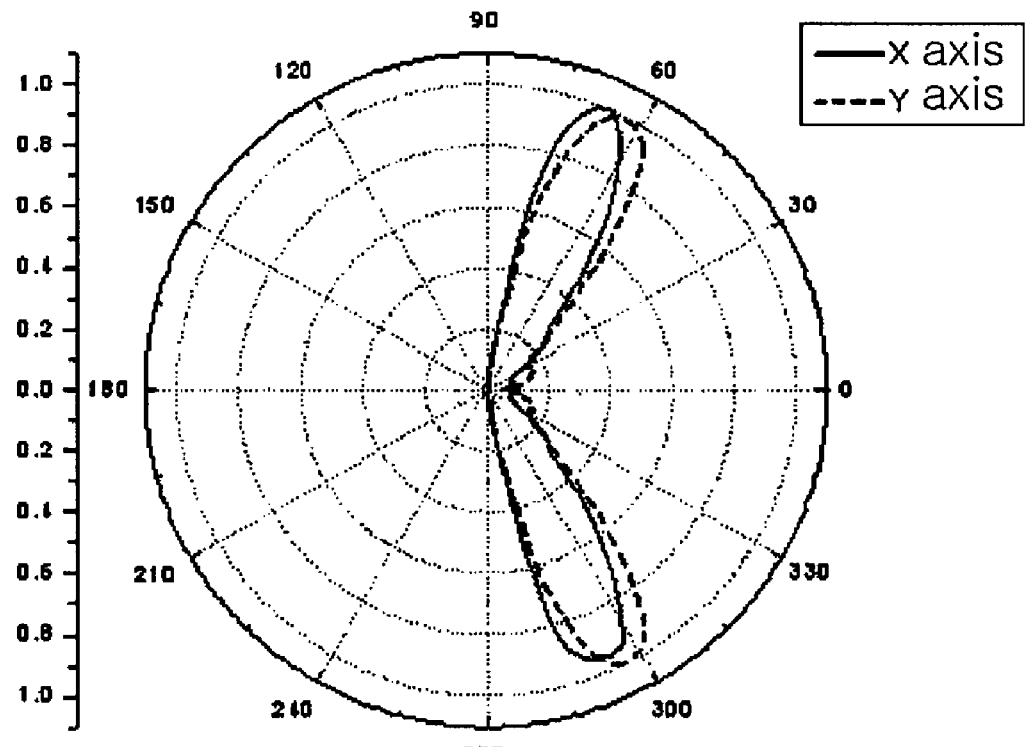

To illustrate the operation of the claimed device we shall discuss the device for transformation of radiation from the distributed plane source with divergence of 30 degrees and with the size equal to whole size of the array in the homogeneous divergent beam of 150 degrees. The overall dimensions of an optical microstructure are shown on FIGS. 10a and 10b. The optical microstructure can be employed in a TIR optical microstructure array according to the present invention. The resulting angular and linear distributions of the TIR micro lens array are presented on FIGS. 11a and 11b.

Calculation was performed for the wavelength of 630 nanometers.

The total efficiency was 80%.

The linear distribution was calculated at the distance of 13 mm from the array.

Angle of divergence was 152 degrees.

As the above variant of the invention has been described for the purposes of illustration, it should be clear to specialists, that various modifications, additions and the replacements not going beyond the scope and sense of the claims and description, are possible.

As described above, when a conventional micro lens array is used to diverge input radiation, the large angle of divergence results in Fresnel loss occurs. However, according to the present invention, the optical microstructure array makes use of the total internal reflection to overcome such a problem, thereby improving uniformity of outgoing beams.

We claim:

1. A total internal reflection optical microstructure array comprising:
    an optical incidence surface;
    a plurality of optical microstructures formed on a surface opposite to the optical incidence surface, each of the optical microstructures comprising a plurality of concentric and annular outwardly-extending prismatic units, each of the prismatic units having a reflecting surface and a refractive surface,
    wherein light incident from the optical incidence surface is totally internally reflected by the reflecting surface of the prismatic unit, and the reflected light is refracted by the refractive surface of the prismatic unit and exits,
    wherein a first prismatic unit close to the center of the optical microstructure has a more elevated position than a second prismatic unit close to the edge of the optical microstructure with respect to the optical incidence surface.

2. The optical microstructure array according to claim 1, wherein the central prismatic unit positioned in the center of the optical microstructure is configured in such a manner that light from the refractive surface of the central prismatic unit is directed to a wide-angle area, and the edge prismatic unit posit ioned in the edge of the optical microstructure is configured in such a manner that light from the refractive surface of the edge prismatic unit is directed to an angle area closer to the center than the wide-angle area.

3. The optical microstructure array according to claim 2, each of the optical microstructures is designed in such a manner that any one of the prismatic units located closer to the center directs light to a wider angle area.

4. The optical microstructure array according to claim 1, wherein each of the optical microstructures comprises two to ten grooves.

5. The optical microstructure array according to claim 1, wherein the reflecting surface is calculated in such a manner that the incoming angle of light beam exceeds the angle for total internal reflection, and the maximum (utmost) angle is calculated by formula:

$$\delta = \gamma - \arcsin\left(\frac{n_1}{n_2} \cdot \sin(\alpha)\right) > \arcsin\left(\frac{n_1}{n_2}\right)$$

where α is an input angle, γ is a slope of the reflecting surface, $n_1$ is the refractive index of air, and $n_2$ is the refractive index of the material of an optical microstructure.

6. The optical microstructure array according to claim 1, wherein the functional dependence between the incoming beam, the outgoing beam and the optical microstructure parameters is pre-sented by the formula:

$$\gamma = 0.5 \cdot \left[\left(\left(\frac{\pi}{2} + \arcsin\left(\frac{n_1 \cdot \sin\left(\frac{\pi}{2} - \beta - \varepsilon\right)}{n_2}\right)\right) + \varepsilon\right) + \arcsin\left(\frac{n_1 \cdot \sin(\alpha)}{n_2}\right)\right]$$

where α is an input angle, β is an outgoing angle, γ is a slope of the reflecting surface, ε is a slope of the refractive surface, $n_1$ is the refractive index of air, and $n_2$ is the refractive index of the material of an optical microstructure.

7. The optical microstructure array according to claim 1, wherein the incidence surface is planar.

* * * * *